(12) United States Patent
Yang et al.

(10) Patent No.: US 11,599,290 B2
(45) Date of Patent: Mar. 7, 2023

(54) DATA STORAGE METHOD, ELECTRONIC DEVICE, AND COMPUTER PROGRAM PRODUCT

(71) Applicant: EMC IP Holding Company LLC, Hopkinton, MA (US)

(72) Inventors: Yong Yang, Shanghai (CN); Yunhai Gong, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 47 days.

(21) Appl. No.: 17/085,799

(22) Filed: Oct. 30, 2020

(65) Prior Publication Data

US 2022/0035548 A1  Feb. 3, 2022

(30) Foreign Application Priority Data

Jul. 31, 2020  (CN) .......................... 202010758278.0

(51) Int. Cl.
*G06F 3/06* (2006.01)
*G06F 16/901* (2019.01)

(52) U.S. Cl.
CPC ............ *G06F 3/0646* (2013.01); *G06F 3/061* (2013.01); *G06F 3/0619* (2013.01);
(Continued)

(58) Field of Classification Search
None
See application file for complete search history.

(56) References Cited

U.S. PATENT DOCUMENTS

| | | | | |
|---|---|---|---|---|
| 8,429,359 B1 * | 4/2013 | Desai | ................. | G06F 11/1461 |
| | | | | 711/E12.103 |
| 8,538,919 B1 * | 9/2013 | Nielsen | ............... | H04L 63/0272 |
| | | | | 718/1 |

(Continued)

FOREIGN PATENT DOCUMENTS

| | | | |
|---|---|---|---|
| CN | 106980558 A | * | 7/2017 |
| CN | 111124275 A | * | 5/2020 |

(Continued)

OTHER PUBLICATIONS

Anonymous, "Overview", Oct. 14, 2015, pp. 1-10, https://web.archive.org/web/20151014035103/https://www.tutorialspoint.com/data_structures_algorithms/tree_data_structure.htm (Year: 2015).*

(Continued)

*Primary Examiner* — Christopher D Birkhimer
(74) *Attorney, Agent, or Firm* — Amin, Turocy & Watson, LLP

(57) ABSTRACT

Embodiments of the present disclosure provide a data storage method, an electronic device, and a computer program product. The method includes: determining the number of at least one first storage apparatus of a storage system, each first storage apparatus being persistent and storing a log that includes record entries of to-be-stored data; and writing, if it is determined that the number is greater than a threshold number, the to-be-stored data into a corresponding memory table from the log where the to-be-stored data is located, wherein data in the memory table will be written to a second storage apparatus of the storage system. In this way, the storage efficiency of the storage system can be improved.

20 Claims, 4 Drawing Sheets

(52) U.S. Cl.
CPC .......... *G06F 3/0679* (2013.01); *G06F 3/0685* (2013.01); *G06F 16/9027* (2019.01)

(56) References Cited

U.S. PATENT DOCUMENTS

| | | | | |
|---|---|---|---|---|
| 8,593,678 | B2* | 11/2013 | Ohishi | H04N 1/2166 |
| | | | | 358/1.15 |
| 9,075,705 | B2* | 7/2015 | Hikichi | G06F 11/004 |
| 9,092,182 | B2* | 7/2015 | Ohishi | H04N 1/00944 |
| 9,344,596 | B2* | 5/2016 | Ohishi | H04N 1/00973 |
| 9,800,291 | B1* | 10/2017 | Ben David | H04W 12/06 |
| 10,521,309 | B1* | 12/2019 | Mandic | G06F 11/1458 |
| 2003/0126282 | A1* | 7/2003 | Sarkar | G06F 11/1464 |
| | | | | 709/219 |
| 2004/0117414 | A1* | 6/2004 | Braun | G06F 8/65 |
| 2006/0005074 | A1* | 1/2006 | Yanai | G06F 11/2082 |
| | | | | 714/6.32 |
| 2008/0140902 | A1* | 6/2008 | Townsend | H04B 1/0475 |
| | | | | 710/306 |
| 2008/0307020 | A1* | 12/2008 | Ko | G06F 21/6245 |
| 2011/0236049 | A1* | 9/2011 | Haga | G03G 15/5004 |
| | | | | 399/75 |
| 2012/0166390 | A1* | 6/2012 | Merriman | G06F 16/2365 |
| | | | | 707/613 |
| 2013/0024423 | A1* | 1/2013 | Doshi | G06F 11/1448 |
| | | | | 707/640 |
| 2013/0173554 | A1* | 7/2013 | Ubukata | G06F 11/2094 |
| | | | | 707/640 |
| 2013/0290249 | A1* | 10/2013 | Merriman | G06F 16/278 |
| | | | | 707/610 |
| 2013/0290636 | A1* | 10/2013 | Chen | G06F 12/0811 |
| | | | | 711/E12.024 |
| 2014/0281174 | A1* | 9/2014 | Lee | G06F 12/0246 |
| | | | | 711/103 |
| 2014/0379988 | A1* | 12/2014 | Lyakhovitskiy | G06F 12/0804 |
| | | | | 711/133 |
| 2017/0132082 | A1* | 5/2017 | Resch | G06F 3/067 |
| 2018/0107591 | A1* | 4/2018 | Smith | G06F 3/0613 |
| 2018/0181468 | A1* | 6/2018 | Sharma | G06F 11/1461 |
| 2018/0336133 | A1* | 11/2018 | Turner | G06F 12/1072 |
| 2019/0108137 | A1* | 4/2019 | Ray | G06F 12/121 |
| 2019/0377821 | A1* | 12/2019 | Pleshachkov | G06F 16/273 |
| 2020/0019330 | A1* | 1/2020 | Brandt | G06F 12/0802 |
| 2020/0019476 | A1* | 1/2020 | Arevalo | G06F 12/0815 |
| 2020/0042400 | A1* | 2/2020 | Ashokkumar | G06F 11/1461 |
| 2020/0133869 | A1* | 4/2020 | Liu | G06F 12/0871 |

FOREIGN PATENT DOCUMENTS

| | | | | |
|---|---|---|---|---|
| CN | 111183420 A | * | 5/2020 | ............. G06F 12/00 |
| CN | 111183450 A | * | 5/2020 | .......... G06F 11/1464 |
| CN | 111190874 A | * | 5/2020 | |
| WO | WO-2009151874 A2 | * | 12/2009 | ......... G06F 12/0802 |

OTHER PUBLICATIONS

Anonymous, "Types of Trees in Data Structure MAIN", Dec. 29, 2019, pp. 1-13, https://web.archive.org/web/20191229014955/https://www.educba.com/types-of-trees-in-data-structure/ (Year: 2019).*

Anonymous, "Tree Data Structure", Dec. 14, 2009, pp. 1-5, https://web.archive.org/web/20091214131207/https://www.cs.cmu.edu/~clo/www/CMU/DataStructures/Lessons/lesson4_1.htm (Year: 2009).*

Anonymous, "tree structure", May 2, 2010, pp. 1-8, https://web.archive.org/web/20100502164657/https://searchdatamanagement.techtarget.com/definition/tree-structure (Year: 2010).*

Anonymous, "Everything you need to know about tree data structures", Nov. 5, 2017, pp. 1-38, https://www.freecodecamp.org/news/all-you-need-to-know-about-tree-data-structures-bceacb85490c/ (Year: 2017).*

* cited by examiner

DATA STORAGE METHOD, ELECTRONIC DEVICE, AND COMPUTER PROGRAM PRODUCT

RELATED APPLICATION

The present application claims the benefit of priority to Chinese Patent Application No. 202010758278.0, filed on Jul. 31, 2020, which application is hereby incorporated into the present application by reference herein in its entirety.

TECHNICAL FIELD

Embodiments of the present disclosure relate to the field of computers, and more particularly, to a data storage method, an electronic device, and a computer program product.

BACKGROUND

In storage systems, data may be stored based on a tree structure. A conventional storage system usually includes one or more volatile memories and/or one or more non-volatile storage devices. The volatile memory may include, for example, a random access memory (RAM), and the non-volatile storage device may include, for example, a storage disk such as a solid state drive (SSD). In a data storage process, an input/output (IO) operation between the volatile memory and the non-volatile storage device is involved. However, in current storage systems, volatile memories are usually used for processing data to be processed. The method is prone to data loss when the storage systems are powered off or fail, thereby reducing system storage efficiency.

SUMMARY

The embodiments of the present disclosure provide a data storage management solution.

In a first aspect of the present disclosure, a data storage method is provided. In the method, the number of at least one first storage apparatus of a storage system is determined. Each first storage apparatus is persistent and stores a log that includes record entries of to-be-stored data. If it is determined that the number is greater than a threshold number, the to-be-stored data is written into a corresponding memory table from the log where the to-be-stored data is located. Data in the memory table will be written to a second storage apparatus of the storage system.

In a second aspect of the present disclosure, an electronic device is provided. The electronic device includes a processor and a memory that is coupled to the processor and has instructions stored therein. The instructions, when executed by the processor, cause the electronic device to execute actions. The actions include: determining the number of at least one first storage apparatus of a storage system, each first storage apparatus being persistent and storing a log that includes record entries of to-be-stored data; and writing, if it is determined that the number is greater than a threshold number, the to-be-stored data into a corresponding memory table from the log where the to-be-stored data is located, wherein data in the memory table will be written to a second storage apparatus of the storage system.

In a third aspect of the present disclosure, a computer program product is provided. The computer program product is tangibly stored on a computer-readable medium and includes machine-executable instructions. The machine-executable instructions, when executed, cause a machine to perform any steps of the method according to the first aspect.

The summary part is provided to introduce the selection of concepts in a simplified form, which will be further described in the Detailed Description below. The summary part is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components. In the accompanying drawings.

DETAILED DESCRIPTION

Figure 1:
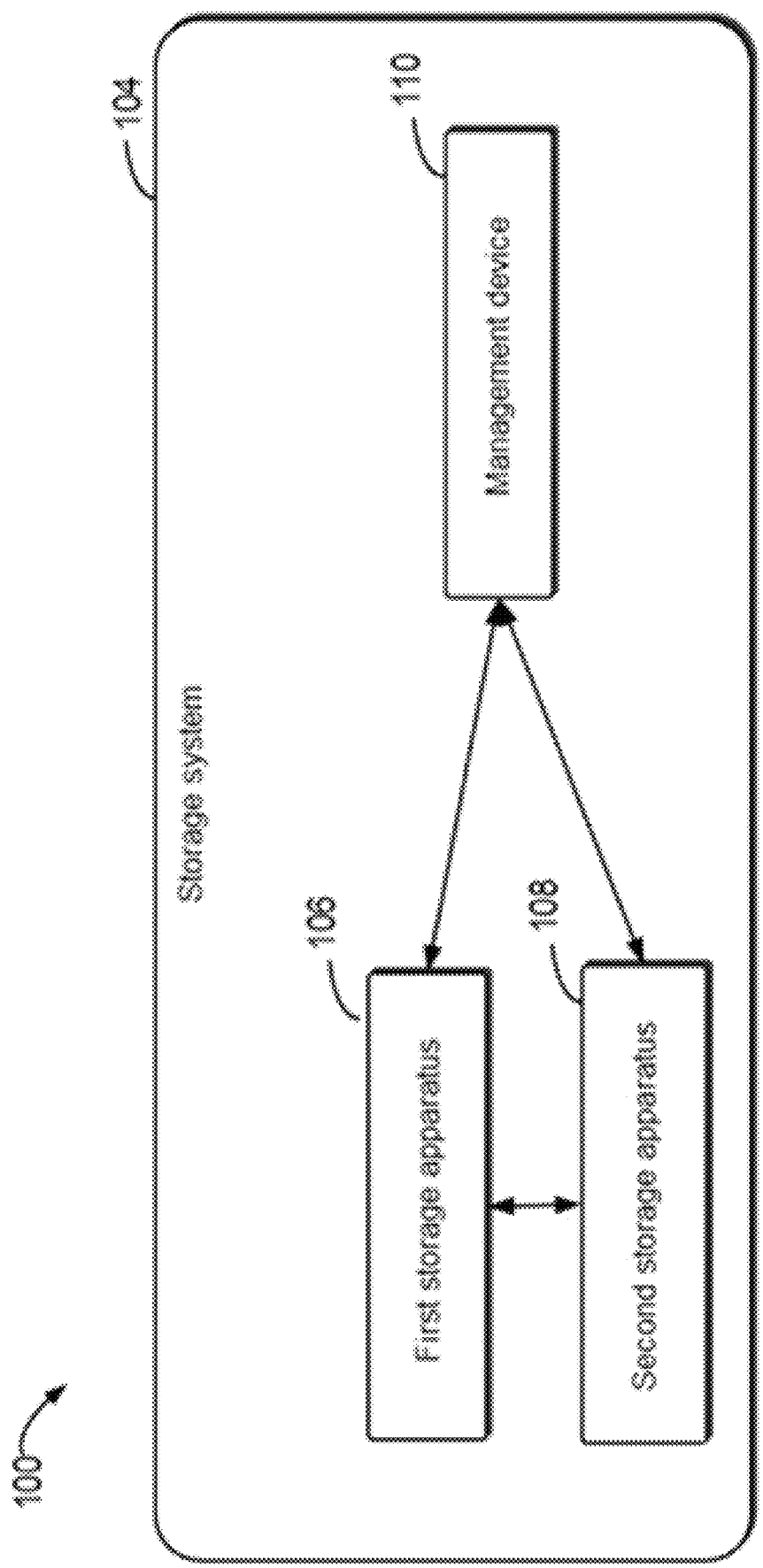
FIG. 1 schematically shows a schematic diagram of an example environment according to an embodiment of the present disclosure.

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" indicates "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

In a storage system, a tree structure such as a log structured merge (LSM) tree may be used to store data, for example, to store associated metadata in the form of key-value pairs. In the tree structure such as LSM, to-be-stored data is generally first stored in a memory table (memtable). The memory table is usually included in a volatile memory (in-volatile-memory), which is configured to store data before data stored in the memory table is written to non-volatile storage device(s) such as SSDs.

Since data in the volatile memory is volatile, data in the memory table will be lost in the case of data loss in the memory table such as power failure or system crash. Moreover, in the storage system, database transactions (operations or operation sequences on data) should meet an ACID principle, namely, Atomicity, Consistency, Isolation, and Durability. At least to ensure atomicity and durability, it is generally necessary to provide a log storage space, or a log block, or a log disk on a non-volatile storage device to store a log associated with the memory table. In the following, the log is sometimes referred to as a log file or a write ahead log.

For example, in the case of data loss in the memory table, the log may be used for data recovery (sometimes called replay) to ensure durability. Therefore, before the to-be-stored data is written to the memory table, it generally needs to be stored as a record entry in the log file. In order to recover the lost data in the memory table, it is necessary to acquire the required record entry from the log file to recover the memory table in the volatile memory. A certain latency will be caused, and data in the log needs to be written to the volatile memory again, thus occupying system resources and affecting the IO performance of the storage system.

An embodiment of the present disclosure provides a method for storing data using a persistent memory. In the method, to-be-written data is first cached in a log file in a persistent memory of a storage system, and then, when predetermined conditions are satisfied, the to-be-written data is written from the log file to a memory table in the same persistent memory. The memory table will be merged into a mass storage apparatus of the storage system. In this way, the storage efficiency of the storage system can be effectively improved.

FIG. 1 shows a schematic diagram of example environment 100 according to an embodiment of the present disclosure. In the example environment, a device and/or a method according to an embodiment of the present disclosure may be implemented. As shown in FIG. 1, storage system 104 may receive a request from user equipment for storing to-be-stored data. According to the request, storage system 104 may store the to-be-stored data at an appropriate position, for example, in first storage apparatus 106 or in second storage apparatus 108. In some embodiments, management device 110 of the storage system may first store the to-be-stored data in first storage apparatus 106, for example, in a memory table (not shown) in first storage apparatus 106. Then, as storage system 104 runs to receive more data from the user equipment, management device 110 may store the to-be-stored data from first storage apparatus 106 to second storage apparatus 108 when the predetermined conditions are satisfied.

It can be understood that although FIG. 1 only shows one first storage apparatus 106 and one second storage apparatus 108, the number of the apparatuses is not limited in the present application. In some embodiments, as will be discussed in detail below, there may be a plurality of first storage apparatuses at a plurality of storage system nodes, for example, to make the storage system have higher fault tolerance. The storage system nodes may be located in different geographic locations and communicate via a network.

In some embodiments, the functionality of management device 110 may be implemented by one of a plurality of storage nodes in the storage system. In some embodiments, management device 110 may be a component in the storage system, such as a controller in the storage system. In some other embodiments, management device 110 may also be communicatively coupled to storage system 104. It should be understood that the foregoing structure is only an example, and the embodiments of the present disclosure are not limited thereto.

The term "first storage apparatus" used herein may refer to a persistent memory located on a bus. The persistent memory is persistent, that is, data stored thereon will not be lost in the case of power failure or system crash. The cost and capacity of the persistent memory are better than those of a conventional volatile memory. A persistent data structure in the persistent memory may be designed to replace a data structure in the conventional volatile memory such as a RAM in order to achieve byte-addressable in-place update and durability.

The persistent memory may be accessed by applications by using, for example, a persistent memory development kit. The persistent memory may be configured to realize the functionality of a conventional memory, or may also be configured to realize the functionality of a conventional storage disk.

Generally speaking, the read/write latency of the RAM may be on the order of tens of nanoseconds, and the read/write latency of the persistent memory may be on the order of hundreds of nanoseconds. The read/write latency according to an NVMe protocol SSD may be on the order of microseconds. Therefore, the persistent memory also has good latency characteristics. However, because the adopted protocol is different from that of the conventional memory, the management mode will be very different. Therefore, there is a need for designing a data structure such as a memory table on the persistent memory.

In the following, the first storage apparatus is sometimes also referred to as a "persistent storage apparatus" or a PMEM.

The term "second storage apparatus" used herein may refer to a storage disk or a collection of storage disks. The storage disk may include various types of devices having a storage function, including but not limited to a hard disk drive (HDD), an SSD, a removable disk, a serial-attached small computer system interface (SCSI) storage disk (SAS), a serial advanced technology attachment (SATA) storage disk, any other magnetic storage devices and any other optical storage devices, or any combination thereof.

A process of controlling data storage according to an embodiment of the present disclosure will be described below with reference to FIGS. 2 to 4. For ease of understanding, specific data mentioned in the following description is exemplary and is not intended to limit the scope of protection of the present disclosure.

Figure 2:
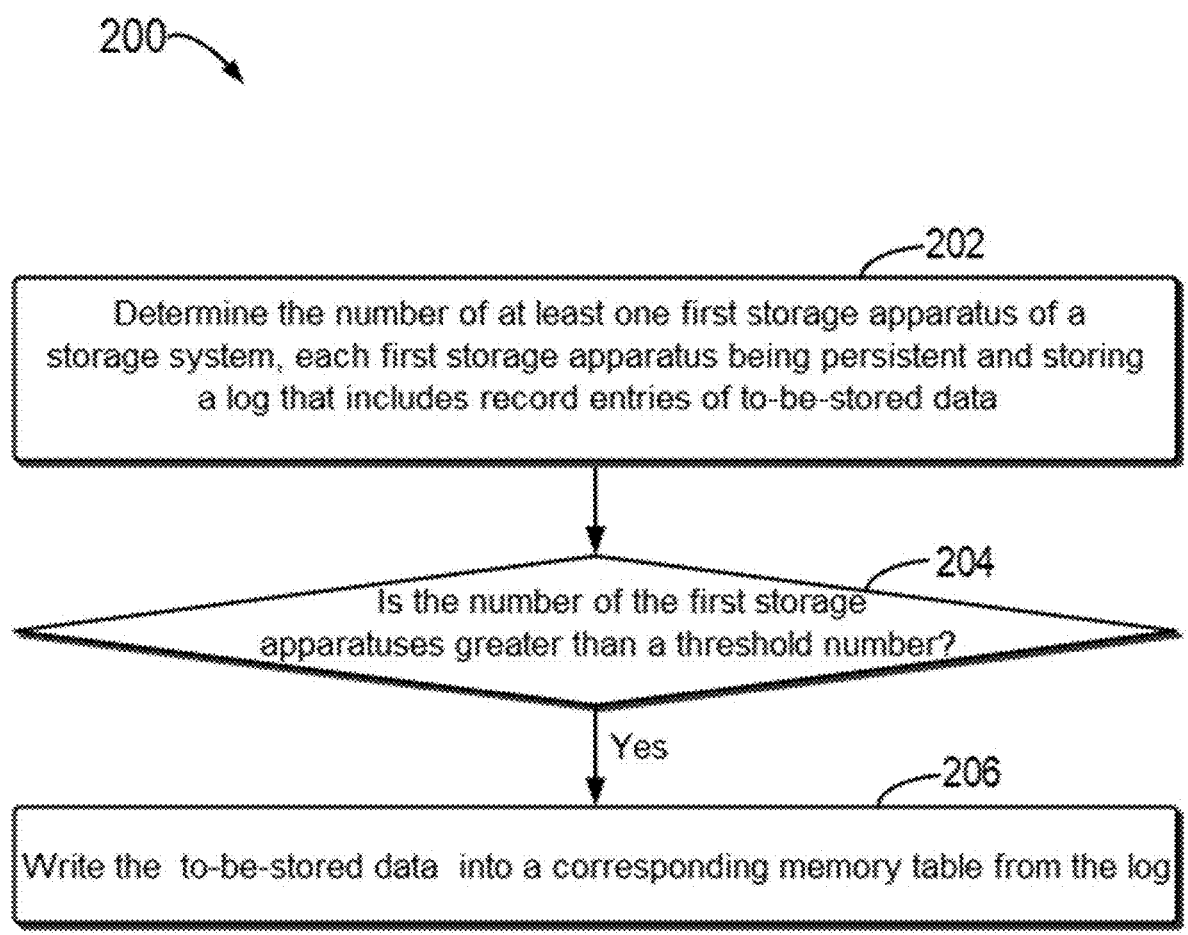
FIG. 2 schematically shows a block diagram of a data storage process according to an embodiment of the present disclosure.

FIG. 2 schematically shows a block diagram of data storage process 200 according to an embodiment of the present disclosure. For ease of description, process 200 will be described below with reference to distributed storage system 300 shown in FIG. 3 according to an embodiment of the present disclosure. Process 200 may be implemented in management device 110 shown in FIG. 1, or management device 310 shown in FIG. 3, or other suitable devices. It should be understood that process 200 may also include additional actions not shown and/or omit actions shown, and the scope of the present disclosure is not limited in this regard.

At block 202, management device 310 may determine the number of at least one first storage apparatus of storage system 304. Each first storage apparatus is persistent and stores a log that includes record entries of to-be-stored data.

Figure 3:
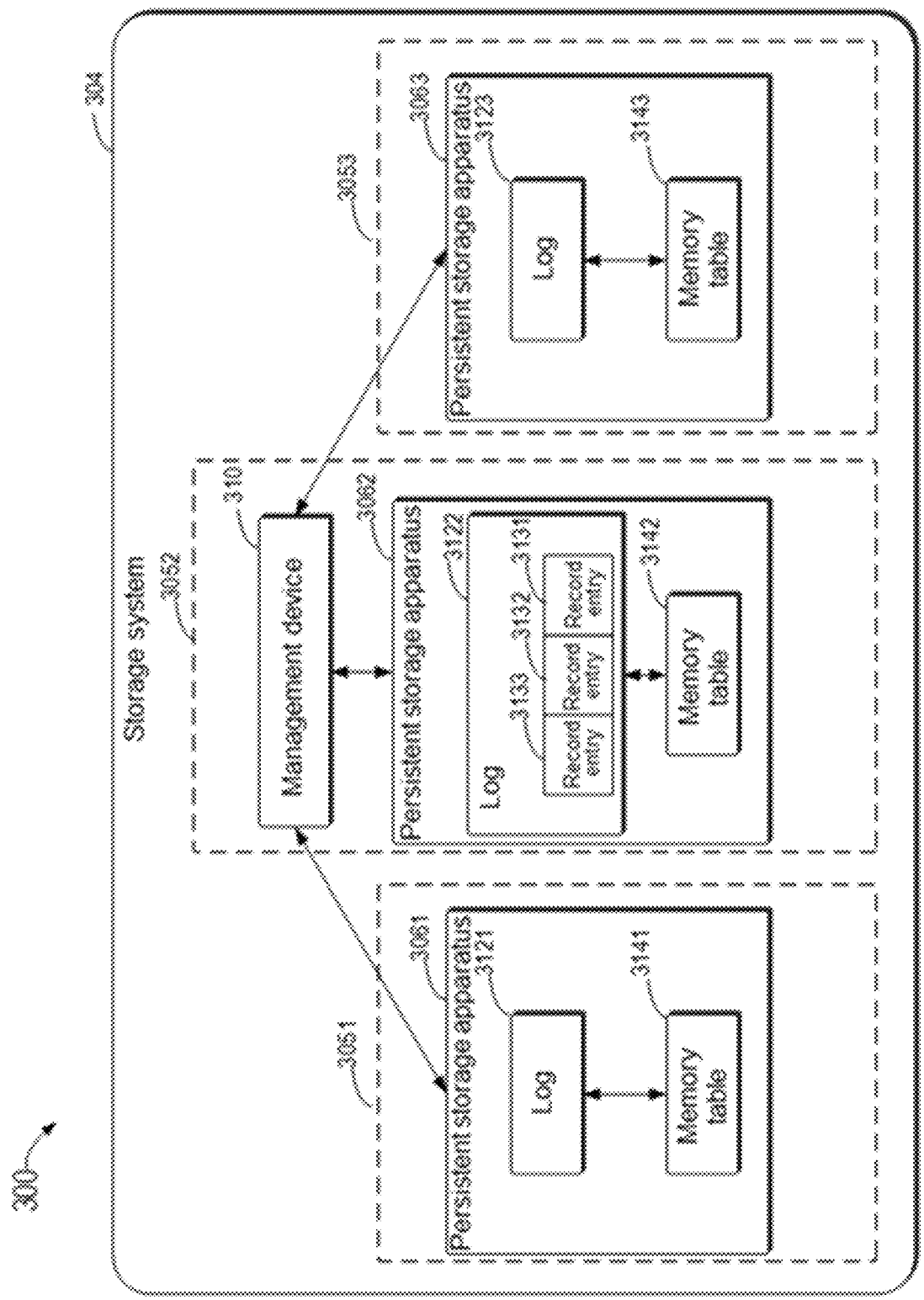
FIG. 3 schematically shows a block diagram of a distributed storage system according to an embodiment of the present disclosure.

Referring now to FIG. 3, storage system 304 may include a plurality of persistent storage apparatuses. For example, storage system 304 may include three persistent storage apparatuses $306_1$, $306_2$, and $306_3$ as shown in the figure, and persistent storage apparatuses $306_1$, $306_2$, and $306_3$ are respectively disposed in three storage system nodes $305_1$, $305_2$, and $305_3$. Persistent storage apparatus $306_1$ includes log $312_1$ and memory table $314_1$, persistent storage apparatus $306_2$ includes log $312_2$ and memory table $314_2$, and persistent storage apparatus $306_3$ includes log $312_3$ and memory table $314_3$. In some embodiments, the persistent storage apparatus may be configured to function as a memory, but data stored therein (for example, logs and memory tables) will not be lost in the cases such as power failure.

It can be understood that a plurality of storage system nodes and corresponding persistent storage apparatuses are provided to ensure the reliability and redundancy of storage system 304. In some embodiments, for a storage system that does not have high reliability requirements and does not need to be redundant, there may be only one storage system node (for example, storage system node 3052) in the storage system. The embodiments of the present disclosure are still applicable to such storage systems.

In some embodiments, memory tables 3141, 3142, and 3143 may be designed such that from the perspective of the user equipment or even the second storage apparatus, the plurality of memory tables are regarded as a whole memory table.

In a distributed storage system having three nodes in FIG. 3, one storage system node 3052 may be regarded as a primary storage system node, and the remaining two storage system nodes 3051 and 3053 may be regarded as secondary storage system nodes. The primary storage system node is configured to coordinate operations of the secondary storage system nodes. Therefore, in some embodiments, a node where management device 310 is located may be regarded as the primary storage system node.

Storage system 304 may receive a request for writing to-be-stored data from the user equipment. In some embodiments, storage system nodes 3051-3053 may simultaneously receive the to-be-stored data. In some embodiments, the to-be-stored data may be first received by primary storage system node 3052. Then, for example, when the to-be-stored data is successfully included in log 3122 of persistent storage apparatus 3062 as record entry 3131, management device 310 may forward the to-be-stored data to storage system nodes 3051 and 3053, and to corresponding persistent storage apparatuses 3061 and 3063 accordingly.

The to-be-stored data is to be stored in a tree structure of storage system 304. First, the to-be-stored data needs to be stored in memory tables 3141, 3142, and 3143. To ensure the atomicity of transactions, before the to-be-stored data is stored in the memory table, management device 310 first makes logs 3121, 3122, and 3123 in persistent storage apparatuses 3061, 3062, and 3063 record the to-be-stored data as a record entry.

The term "log" used herein may have a data structure, which is designed as a sequence of record entries recorded in the order of writing. For example, taking log 3122 as an example, a sequence of record entries 3131, 3132, and 3133 are sequentially recorded. Each record entry is associated with the corresponding to-be-stored data. For example, the most recently written to-be-stored data is recorded in record entry 3131 at the end of a log queue. In some embodiments, the log may be in the form of a write ahead log, and therefore, other relevant information, such as a serial number, should also be recorded in the record entry.

In some embodiments, determining the number of at least one first storage apparatus may include: receiving an acknowledgment message from one of the plurality of persistent storage apparatuses 3061, 3062, and 3063, the acknowledgment message indicating that the log stored in the persistent storage apparatus includes the record entries of the to-be-stored data; and determining the persistent storage apparatus as the first storage apparatus.

The example in FIG. 3 is still used for description. When the to-be-stored data is sent to persistent storage apparatuses 3061, 3062, and 3063 and has been included in the corresponding logs, the corresponding persistent storage apparatuses may send acknowledgment messages to management device 310 of primary storage system node 3052. For example, it is supposed that in addition to receiving acknowledgment messages from persistent storage apparatus 3062, management device 310 also receives acknowledgment messages from persistent storage apparatus 3061, but does not receive acknowledgment messages from persistent storage apparatus 3063 due to reasons such as network interruption. In the above situation, management device 310 may determine persistent storage apparatuses 3061 and 3062 as the first storage apparatuses, and determine that the number of at least one first storage apparatus is 2.

Referring back to FIG. 2, in block 204, management device 310 may determine whether the number of the at least one first storage apparatus is greater than a threshold number.

The threshold number may be set according to the reliability requirements of the storage system. In some embodiments, the threshold number may be set so that when most nodes have logs including to-be-stored data, management device 310 may write the to-be-stored data to the memory table. The example in FIG. 3 is still used for description. In a storage system having three nodes, the threshold number may be set to 1 when it is tolerant of no response from a single node.

At block 206, if it is determined that the number of the at least one first storage apparatus is greater than a threshold number, management device 310 may write the to-be-stored data into a corresponding memory table from the log where the to-be-stored data is located. Data in the memory table will be written to a second storage apparatus of the storage system.

The storage system having three nodes in FIG. 3 is used for description again. If the threshold number is set to 1, management device 310 may determine that the number of the at least one first storage apparatus is greater than the threshold number when there are at least two first storage apparatuses. In some embodiments, only after receiving an acknowledgment message from persistent storage apparatus 3062 in primary storage system node 3052, may the management device determine that the number of the at least one first storage apparatus is greater than the threshold number.

Then, management device 310 may send a write request to the at least one first storage apparatus, so that the to-be-stored data is written from the log of the at least one first storage apparatus into the corresponding memory table. For example, in the case of receiving acknowledgment messages from persistent storage apparatuses 3061, 3062, and 3063, management device 310 may send a command (for example, submit a command) to persistent storage apparatuses 3061, 3062, and 3063 to write the to-be-stored data associated with the record entries in logs 3121, 3122, and 3123 in persistent storage apparatuses 3061, 3062, and 3063 into memory tables 3141, 3142, and 3143, respectively. In some embodiments, the memory table may store a plurality of key-value pairs written during a period of time, for example, in an ordered manner.

In some embodiments, when the above actions are all completed, management device 310 may send a message to a user indicating that the writing is successful.

In some embodiments, if it is determined that the number of the at least one first storage apparatus is not greater than the threshold number, management device 310 removes the record entries of the to-be-stored data from each log.

In this case, the reliability of the storage system cannot be ensured. The storage system having three nodes in FIG. 3 is used for description once again. In the case that no acknowledgment message from persistent storage apparatuses 3061 and 3063 is received, management device 310 will not send a command to persistent storage apparatus 3062 to write the to-be-stored data to memory table 3142. In this case, management device 310 removes record entry 3131 associated with the to-be-stored data from log 3122. And a user request will be rejected and fails. In some embodiments, when the above actions are all completed, management device 310 may send a message to a user indicating that the writing fails.

In this way, when the number of the at least one first storage apparatus is not greater than the threshold number, the log may be used to revoke the to-be-stored data, thereby ensuring the consistency of data on a plurality of nodes and ensuring the atomicity of a data writing operation.

When predetermined conditions are satisfied, data in the memory table will be written to a second storage apparatus (not shown in FIG. 3) of storage system 304. This will be discussed in more detail with reference to FIG. 4 below.

In a conventional distributed storage system using a volatile memory, log files generally need to be copied to blocks or storage disks of a plurality of storage system nodes (for example, 3 or more) in order that the acquisition of log files can still be ensured when one or more storage system nodes in the plurality of storage system nodes cannot be used. In this case, during log replay, it may be necessary to load log files from remote storage nodes across the network, which introduces a higher latency.

According to an embodiment of the present disclosure, the memory table in the first storage apparatus itself can provide persistence for data, so there is no need to set blocks or storage disks for storing log files in the second storage apparatus, so that the process of data recovery (i.e., replay) using the log files in the second storage apparatus in the case of system restart and the like can be omitted, thereby saving time spent in the process and occupied system resources. In addition, since log files are also stored in the first storage apparatus in the same storage system node, there is no need to load log files from remote storage system nodes across the network, thereby further reducing the latency.

In some embodiments, storage system 304 may also receive a read request for data to be read. The read request will be processed, for example, at storage system node 3052 including management device 310. For example, storage system node 3052 may coordinate storage system nodes 3051 and/or 3053 to retrieve the data to be read from the memory tables of the persistent storage apparatuses therein, or from the second storage apparatus, so as to provide the consistency for the read request.

In the following, how to store data from the first storage apparatus to the second storage apparatus will be described with reference to FIGS. 1 and 4. FIG. 4 schematically shows a block diagram of a process of storing data to a second storage apparatus according to an embodiment of the present disclosure.

Figure 4:
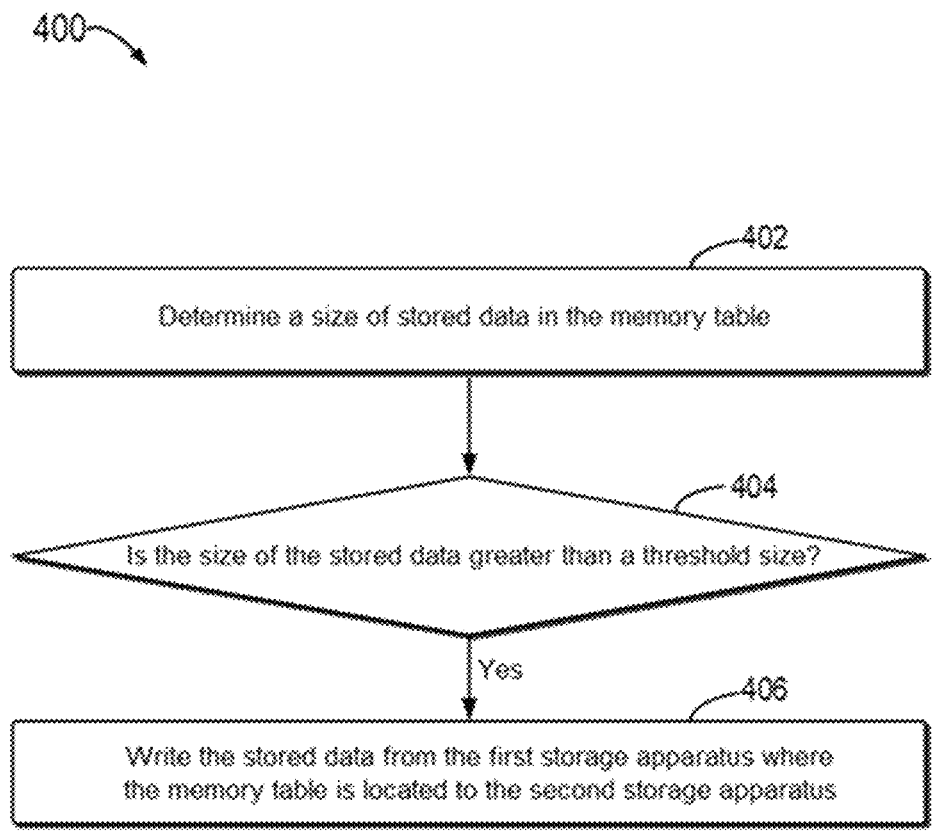
FIG. 4 schematically shows a block diagram of a process of storing data to a second storage apparatus according to an embodiment of the present disclosure.

As shown in FIG. 4, at block 402, management device 110 may determine a size of stored data in the memory table. Here, since the memory table has a certain capacity, when data is written into the memory table in first storage apparatus 106, it may not be written into second storage apparatus 108 such as an SSD immediately.

At block 404, management device 110 may determine whether the size of the stored data is greater than a threshold size. The threshold size may indicate the size of data that can be stored in the memory table. Since first storage apparatus 106 adopts a persistent memory, the maximum capacity is larger than that of a conventional volatile memory, so the size of data that can be stored in the memory table therein may also be larger. In some embodiments, the threshold size may be determined based on the maximum capacity of first storage apparatus 106 where the memory table is located. For example, the threshold size may be equal to 128 GB, but other sizes are also possible. The threshold size may be selected so that after the to-be-stored data (for example, a key-value pair having a size of 1 KB associated with metadata) is written to the memory table, when management device 110 determines that the size of the stored data is greater than the threshold size, the memory table is exactly fully filled.

At block 406, if it is determined that the size of the stored data is greater than the threshold size, the management device may write the stored data in the memory table from first storage apparatus 106 where the memory table is located to second storage apparatus 108.

The memory table may be a part of the tree structure of the storage system. Since data that can be stored in the memory table is limited, when the memory table in first storage apparatus 106 is fully filled, the memory table will be stored in second storage apparatus 108 with a larger capacity. The process may be referred to as dumping, which may be implemented, for example, by merging the memory table into another table on second storage apparatus 108 in the tree structure. The additional tables may store sorted data (for example, sorted key-value pairs).

In some embodiments, the tree structure may adopt an LSM tree structure, the memory table in first storage apparatus 106 may be located at a first level in the LSM tree structure, and another table on second storage apparatus 108 may be located at a second level or a higher level in the LSM tree structure. Whenever the predetermined conditions are satisfied, management device 110 will trigger the merging of a table file in a lower level to a table file in a higher level. It can be understood that to merge a file to a higher level, a plurality of files may need to be written, and there is a certain degree of write amplification.

In some embodiments, after block 406 is executed, management device 110 may clear the memory table for subsequent writing of new to-be-stored data.

As discussed above, storing data from one storage apparatus (e.g., persistent memory) to another storage apparatus (e.g., storage disk(s)) may be referred to as dumping. Since there will be continuously written to-be-stored data in a storage system such as a cloud storage system, it can be considered that a dump will be performed approximately at a predetermined time interval in the storage system. The dump process will take up a lot of system resources (e.g., IO resources), affect a write speed, and cause write amplification. Therefore, frequent dumps are not expected.

The dump time between two adjacent dumps may be calculated by the following equations (1) and (2):

$$\text{TPS} = N/L \qquad (1)$$

$$T = (C*r)/(K*\text{TPS}) \qquad (2)$$

TPS represents the number of transactions per second. N represents the number of parallel threads. Generally, there is one thread on a single node. L represents a latency for write requests. K represents the size of a key value. In a common storage system, K may be, for example, equal to 1 KB. r represents the utilization ratio of a total capacity of a memory (e.g., a dynamic random access memory or a persistent storage apparatus). In the common storage system, r may be, for example, equal to 0.8 or greater. C represents a total capacity of a memory table, that is, a total size of data that can be stored in the memory table. T represents a dump time, which may indicate an interval time between two adjacent dumps. The following Table 1 shows a typical example of the above-mentioned parameters of a storage system using a dynamic random access memory and a persistent storage apparatus (i.e., the first storage apparatus described above).

TABLE 1

Example parameters of memory tables in DRAM and PMEM

| Parameter | Memory table in dynamic random access memory (DRAM) | Memory table in persistent storage apparatus (PMEM) |
| --- | --- | --- |
| Key-value size (K) | 1 KB | 1 KB |
| Utilization ratio (r) | 0.8 | 0.8 |
| Total capacity (C) | 128 MB | 128 GB |
| Write latency (L) | 2 ms | 200 us |

Since the capacity of the PMEM is far greater than the capacity of the DRAM, the capacity of the memory table in the PMEM is in the order of GB (e.g., 128 GB), which is much larger than the capacity of the memory table in the DRAM in the order of MB (e.g., 128 MB). Meanwhile, for the reasons discussed above, the latency (e.g., 200 us) of the storage system using the memory table in the PMEM is much smaller than the latency (e.g., 2 ms) of the storage system using the memory table in the DRAM. In one example, when K and r are the same, using the above equations (1) and (2) and the example parameters in Table 1, it can be calculated that the dump time of the storage system using the memory table in the PMEM is about 20,000 s, and the dump time of the storage system using the memory table in the DRAM is about 200 s. Therefore, the dump time of the storage system using the memory table in the PMEM is much longer than that of the storage system using the memory table in the DRAM.

According to an embodiment of the present disclosure, data storage using a memory table in a first storage apparatus such as a PMEM can significantly increase the dump time, thereby reducing the frequency of dumping from the first storage apparatus to a second storage apparatus. A smaller dumping frequency can further reduce write amplification and achieve higher storage system stability, so the storage efficiency of the storage system can be improved.

Figure 5:
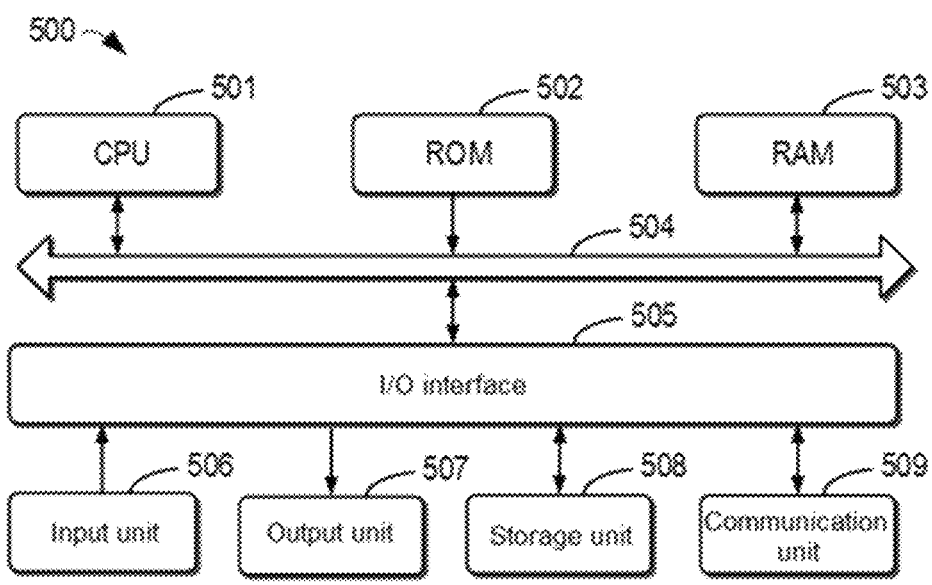
FIG. 5 schematically shows a block diagram of an example device that may be configured to implement an embodiment of the present disclosure.

FIG. 5 shows a schematic block diagram of example electronic device 500 that may be configured to implement an embodiment of the present disclosure. For example, electronic device 500 may be configured to implement a management device as shown in FIG. 1 or FIG. 3. As shown in the figure, device 500 includes central processing unit (CPU) 501 that may perform various appropriate actions and processing according to computer program instructions stored in read-only memory (ROM) 502 or computer program instructions loaded from storage unit 508 to (RAM) 503. RAM 503 may also store various programs and data necessary for operations of device 500. CPU 501, ROM 502, and RAM 503 are connected to each other by bus 504. I/O interface 505 is also connected to bus 504.

A plurality of members in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices via a computer network such as the Internet and/or various telecommunication networks.

Processing unit 501 executes various methods and processing described above, e.g., any one of processes 200, 400, and 500. For example, in some embodiments, any one of processes 200, 400, and 500 may be embodied as a computer software program or a computer program product that is tangibly included in a machine-readable medium, e.g., storage unit 508. In some embodiments, some or all of the computer program may be loaded and/or installed onto device 500 via ROM 502 and/or communication unit 509. When the computer program is loaded into RAM 503 and executed by CPU 501, one or more steps of any one of processes 200, 400, and 500 described above may be performed. Alternatively, in other embodiments, CPU 501 may be configured in any other suitable manner (e.g., by means of firmware) to implement either of processes 200 and 400.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, any non-transitory storage device, or any appropriate combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device, such as a punch card or a protruding structure within a groove with instructions stored thereon, and any suitable combination thereof. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein may be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer may be connected to a user computer over any kind of networks, including a local area network (LAN) or a wide area network (WAN), or may be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations or technical improvements of the technologies on the market, or to enable other persons of ordinary skill in the art to understand the implementations disclosed herein.

According to some embodiments of the present disclosure, a computer-readable medium having a computer program stored thereon is provided. The program, when executed by a processor, implements the method according to the present disclosure.

Those skilled in the art should understand that the steps of the above method of the present disclosure may be implemented by a general-purpose computing apparatus, and may be centralized on a single computing apparatus or distributed over a network composed of a plurality of computing apparatuses. Optionally, they may be implemented using program code executable by a computing apparatus, so that they may be stored in a first storage apparatus and executed by a computing apparatus, or they may be made into integrated circuit modules respectively, or they may be implemented by making a plurality of modules or steps of them into a single integrated circuit module. Thus, the present disclosure is not limited to any particular combination of hardware and software.

It should be understood that although some apparatuses or sub-apparatuses of the device are mentioned in the above detailed description, such division is merely illustrative rather than mandatory. In fact, the features and functions of two or more apparatuses described above may be embodied in one apparatus according to the embodiments of the present disclosure. On the contrary, the features and functions of one apparatus described above may be embodied by further dividing the apparatus into a plurality of apparatuses.

The above description is only optional embodiments of the present disclosure, and is not intended to limit the present disclosure. For those skilled in the art, the present disclosure may take on various modifications and alterations. Any modification, equivalent replacement, improvement, and the like made within the spirit and principle of the present disclosure should be encompassed in the scope of protection of the present disclosure.

What is claimed is:

1. A method, comprising:
receiving, by a primary storage apparatus of a storage system comprising a processor, a request to write a record entry;
writing, by the primary storage apparatus, the record entry to a log in storage that is local to the primary storage apparatus;
instructing, by the primary storage apparatus, respective secondary storage apparatuses of a group of secondary storage apparatuses to write the record entry to respective logs of the secondary storage apparatuses, wherein the respective logs are configured to store record entries of to-be-stored data, and wherein the respective logs are persistent;
determining, by the primary storage apparatus, a number of the secondary storage apparatuses of the group of secondary storage apparatuses that have completed writing the record entry;
determining, by the primary storage apparatus, that the number is greater than a threshold number; and
in response to determining that the number is greater than the threshold number, instructing, by the primary storage apparatus, the secondary storage apparatuses that have completed writing the record entry to write the respective copies of the record entry into corresponding respective memory tables from the respective logs where the to-be-stored data is located, and wherein data in the corresponding respective memory tables is to be written to a third storage apparatus of the storage system.

2. The method according to claim 1, wherein determining the number of the secondary storage apparatuses comprises:
receiving an acknowledgment message from one of the secondary storage apparatuses, the acknowledgment message indicating that the log stored in the secondary storage apparatus comprises a copy of the respective copies of the record entry; and
determining that the number of secondary storage apparatuses comprises the secondary storage apparatus.

3. The method according to claim 1, wherein writing the respective copies of the record entry comprises:
in response to determining that the number is greater than the threshold number, sending a write request from the primary storage apparatus to the secondary storage apparatuses, as a result of which the respective copies of the record entry are written from the respective logs into the corresponding respective memory tables, wherein the primary storage apparatus is configured to store a first copy of the record entry.

4. The method according to claim 1, further comprising:
in response to determining that the number is not greater than the threshold number, removing the respective copies of the record entry from the respective logs.

5. The method according to claim 1, further comprising:
determining a size of stored data in a first memory table of the corresponding respective memory tables; and
in response to determining that the size of the stored data is greater than a threshold size, writing the stored data in the first memory table from a secondary storage apparatus of the secondary storage apparatuses to a fourth storage apparatus, wherein the secondary storage apparatus is where the first memory table is located.

6. The method according to claim 5, wherein the threshold size is determined based on a maximum capacity of the secondary storage apparatus of the secondary storage apparatuses where the first memory table is located.

7. The method according to claim 1, wherein the corresponding respective memory tables are a part of respective tree structures of the storage system.

8. An electronic device, comprising:
a processor; and
a memory coupled to the processor and having instructions stored therein, wherein the instructions, when executed by the processor, cause the electronic device to execute actions comprising:
determining, by a primary storage apparatus of a storage system, a number of secondary storage apparatuses of a group of secondary storage apparatuses that have completed writing a record entry of to-be-stored data to respective logs, wherein each secondary storage apparatus of the group of secondary storage apparatuses is persistent, and wherein each secondary storage apparatus of the number of secondary storage apparatuses is configured to store a respective log of respective logs that comprises a respective copy of the record entry; and
based on the primary storage apparatus determining that the number is greater than a threshold number, instructing, by the primary storage apparatus, the secondary storage apparatuses to write the respective copy of the record entry into corresponding respective memory tables from the respective logs where the respective copies of the record entry are located, and wherein data in the respective memory tables is to be written to another storage apparatus of the storage system other than the primary storage apparatus and the group of secondary storage apparatuses.

9. The electronic device according to claim 8, wherein determining the number of the secondary storage apparatuses comprises:
receiving an acknowledgment message from one of the secondary storage apparatuses, the acknowledgment message indicating that the log stored in the secondary storage apparatus comprises a copy of the respective copies of the record entry; and
determining that the number of secondary storage apparatuses comprises the secondary storage apparatus.

10. The electronic device according to claim 8, wherein writing the respective copies of the record entry into the corresponding respective memory tables from the respective logs comprises:
sending, in response to determining that the number is greater than the threshold number, a write request from the primary storage apparatus to the secondary storage apparatuses, so that the respective copies of the record entry are written from the respective logs into the corresponding respective memory tables, wherein the primary storage apparatus is configured to store a first copy of the record entry.

11. The electronic device according to claim 8, wherein writing the respective copies of the record entry comprises:
removing the respective copies of the record entry from the respective logs.

12. The device electronic according to claim 8, wherein the actions further comprise:
determining a size of stored data in a first memory table of the respective memory tables; and
writing, based on the size of the stored data being determined to be greater than a threshold size, the stored data in the first memory table from a secondary storage apparatus of the secondary storage apparatuses to a third storage apparatus.

13. The electronic device according to claim 12, wherein the threshold size is determined based on a maximum capacity of the secondary storage apparatus of the secondary storage apparatuses and wherein the second storage apparatus is where the first memory table is located.

14. The electronic device according to claim 8, wherein the respective memory tables are a part of respective tree structures of the storage system.

15. A non-transitory computer program product tangibly stored in a computer-readable medium and comprising machine-executable instructions, wherein the machine-executable instructions, when executed, cause a primary storage apparatus of a storage system to perform operations, comprising:

determining a number of secondary storage apparatuses of the storage system, wherein the secondary storage apparatuses are persistent and configured to store respective logs that comprise respective copies of a record entry of record entries of to-be-stored data; and based on the primary storage apparatus determining that the number is greater than a threshold number, instructing the secondary storage apparatuses that have completed writing the record entry to respective logs to write the respective copies of the record entry into corresponding respective memory tables from the respective logs where the to-be-stored data is located, and wherein data in the respective memory tables will be written to another storage apparatus of the storage system other than the primary storage apparatus and the group of secondary storage apparatuses.

16. The non-transitory computer program product according to claim 15, wherein determining the number of the secondary storage apparatuses comprises:

receiving an acknowledgment message from a secondary storage apparatus of the secondary storage apparatuses, the acknowledgment message indicating that a log of the respective logs stored in the secondary storage apparatus comprises a copy of the respective copies of the record entry; and determining that the number of secondary storage apparatuses comprises the secondary storage apparatus.

17. The non-transitory computer program product according to claim 15, wherein writing the respective copies of the record entry comprises:

based on the number being determined to be greater than the threshold number, sending a write request to the secondary storage apparatuses, so that the respective copies of the record entry are written from the respective logs into the corresponding respective memory tables, wherein the primary storage apparatus is configured to store a copy of the record entry.

18. The non-transitory computer program product according to claim 15, wherein the operations further comprise:

based on the number being determined not to be greater than the threshold number, removing the respective copies of the record entry from the respective logs.

19. The non-transitory computer program product according to claim 15, wherein the operations further comprise:

determining a size of stored data in a memory table of the respective memory tables; and where the size of the stored data is determined to be greater than a threshold size, writing the stored data in the memory table from a secondary storage apparatus of the secondary storage apparatuses where the first memory table is located to a third storage apparatus.

20. The non-transitory computer program product according to claim 19, wherein the threshold size is determined based on a maximum capacity of the secondary storage apparatus where the memory table is located, and wherein the memory table is a part of a tree structure of the storage system.

\* \* \* \* \*